Patented May 25, 1926.

1,586,175

UNITED STATES PATENT OFFICE.

GUY H. BUCHANAN, OF WESTFIELD, NEW JERSEY, ASSIGNOR TO AMERICAN CYANAMID COMPANY, OF NEW YORK, N. Y., A CORPORATION OF MAINE.

FUMIGANT AND METHOD OF FUMIGATING.

No Drawing.   Application filed January 19, 1925.   Serial No. 3,504.

This invention relates to fumigation, more particularly to a novel fumigant and to a method of using the same.

It has been well known for a long time that cyanogen chloride gas is very penetrating and is an effective fumigant, although it is stated by some to be less effective than hydrocyanic acid gas, which is one of the best fumigants known. It is easily detected in relatively low concentrations by reason of its odor and its highly lacrymal effect in non-lethal concentrations, and it is thus much safer to use than hydrocyanic acid. It is not injurious to seeds in doses which are toxic to insects and fungi; it is no more toxic toward human beings and no more injurious to plant life than hydrocyanic acid. However, it is stated to be unstable in the presence of moisture and to be incapable of preservation for any length of time.

Because of its insecticidal value and its lacrymal effect it has been proposed as a fumigant mixed with hydrocyanic acid gas in the fumigation of ships, warehouses, factories, elevators, houses and the like where human beings might be present accidentally, in place of hydrocyanic acid alone which cannot be readily detected in less than lethal doses and which has caused fatalities in the past. In accordance with the proposed process the cyanogen chloride was generated from a mixture of hydrochloric acid, water, sodium cyanide, sodium chlorate and with or without talc. The acid and water were mixed and placed in suitable containers and the other ingredients in bags were quickly thrown into the acid mixture by the operators who, as quickly as possible, made their exit from and sealed the space to be fumigated. This was a dangerous procedure and very rigid restrictions were placed on the operators to prevent accidents. The method of fumigation was expensive in that the ingredients used were in themselves costly, they did not react completely and the reaction that took place did not produce anywhere near the theoretical quantities of cyanogen chloride and hydrocyanic acid gases so that the dosage was not uniform nor that calculated. The heat and violence of the reaction often caused splattering of the acid mixture and thus damaged the surrounding objects. Furthermore, this method did not always accomplish the principal object for which the cyanogen chloride was intended, namely, to warn persons accidentally present, because the entire lethal dosage was usually generated at once, sometimes not giving such persons a chance to escape.

My invention, on the other hand, is intended and adapted to utilize the beneficial effects of cyanogen chloride and, at the same time, avoid all the disadvantages inherent in the use thereof in accordance with the teachings of the prior art.

In practicing my invention I made a complete study of the properties and characteristics of cyanogen chloride and hydrocyanic acid, both in the liquid and gaseous states, and separately and in admixture. It has been determined that hydrocyanic acid in alkaline solution is decomposed to azulmic acid and that cyanogen chloride under similar conditions is converted to the chloride and cyanate of the alkali. It has also been stated that cyanogen chloride polymerizes readily to cyanuric chloride, which in turn in the presence of water decomposes with the formation of hydrochloric and cyanuric acids. Hydrocyanic acid is decomposed by strong mineral acids, such as hydrochloric acid, forming ammonium formate. It was furthermore the general opinion of previous investigators that cyanogen chloride, unless absolutely pure, could not be preserved, and as far as I am aware, no one had previously succeeded in completely stabilizing the same. They stated that hydrochloric acid causes hydroxylation of the cyanogen chloride to cyanic acid and carbon dioxide in the presence of water at a relatively rapid rate; with strong acid the decomposition is complete in a few hours forming ammonium chloride and carbon dioxide; and if traces of water are present, cyanogen chloride decomposes forming ammonium chloride. My investigations have shown that cyanogen chloride alone is unstable, whether acid or alkaline, and that hydrocyanic acid, although stabilized to a certain extent by the addition of a small amount of a mineral acid, eventually decomposes to azulmic acid and other products. It was to be expected that mixtures of these two compounds, especially in the presence of water, would rapidly decompose, but as a result of my experiments I have concluded, contrary to the general belief and the statements of earlier investigators, that cyanogen chloride in the liquid state and mixed with hydrocyanic acid may be completely stable even in the presence of water. This may be accomplished by making the liquid mixture of cyanogen chloride, hydrocyanic acid and water very slightly acid, thereby preventing all changes and preserving the ingredients over a long period of time.

Therefore, in practicing my invention I provide a mixture of liquid cyanogen chloride and hydrocyanic acid, the latter generally being in greater proportion. Since it is extremely difficult to obtain anhydrous hydrocyanic acid I preferably utilize the hydrocyanic acid of commerce which may contain 4% or more of water, and render the mixture of cyanogen chloride and hydrocyanic acid slightly acid to methyl orange indicator to preserve the ingredients from decomposition and other changes. The proportions of the ingredients may be varied to a considerable degree but generally I utilize less than 50% cyanogen chloride and in excess of 50% hydrocyanic acid with a water content as high as 10%. The acidity is made 0.01 N to 0.025 N but may be even higher.

For example I may add one part by weight of liquid cyanogen chloride to ten parts by weight of liquid sulfur-free hydrocyanic acid containing from 96% to 98% HCN and from 4% to 2% water and adjust the acidity to 0.01 N to 0.025 N by the use of an acid, such as sulphuric, hydrochloric, acetic or the like. If the mixture is too acid I may add an alkali, such as sodium hydroxide, to reduce the acidity to the desired degree. The following figures indicate various compositions which have been found satisfactory:

|   | HCN. | CNCL. | H$_2$O. | Acidity N. |
|---|---|---|---|---|
|   | Per cent. | Per cent. | Per cent. |   |
| 1 | 76.0 | 20.0 | 4 | 0.023 |
| 2 | 82.0 | 14.0 | 4 | 0.024 |
| 3 | 68.5 | 27.5 | 4 | 0.017 |
| 4 | 83.0 | 13.0 | 4 | 0.015 |
| 5 | 85.5 | 10.5 | 4 | 0.015 |
| 6 | 84.5 | 7.5 | 8 | 0.015 |

The volatile liquid mixture may be used for fumigation in any desired manner, as, for instance, by spraying of the calculated amount thereof into the space to be fumigated by a suitable spraying apparatus, such as that shown and described in the patent of R. M. Jackson, No. 1,477,125, dated Dec. 11th, 1923, for fumigating applicator.

In the fumigation of warehouses, ships and the like, which cannot with certainty be cleared of human beings, I have devised the following procedure which has proven effective in eliminating the danger of injury to anyone present in the structure. 1 first introduce into the enclosure, which is properly sealed, an amount of a 15% cyanogen chloride-hydrocyanic acid mixture sufficient to give a concentration which is non-lethal, but the amount of cyanogen chloride is sufficiently great so that the odor is readily detected and the lacrymal effect thereof drives out any persons who may be present. After an interval of five or ten minutes, or even more, the full dose necessary for the fumigation is introduced in the usual manner.

Such a procedure was not practiced in the prior method of generating cyanogen chloride and it is impractical for the fumigator to first mix a portion of the ingredients of the fumigant and then enter the space once more to mix another portion. Consequently the warning period depended entirely upon the rate at which the generation of the fumigant took place, which rate could not be controlled with any degree of accuracy. If the rate was sufficiently slow human beings would have an opportunity of escaping before being overcome, but it must not be too slow, otherwise the rate of leakage from the enclosure might approach the rate of generation sufficiently closely to defeat the purposes of the fumigation. If, on the other hand, the rate of generation was made too fast, then regardless of the lacrymal effect of the cyanogen chloride, human beings would be overcome before escaping.

With my fumigant this danger is eliminated because long before a lethal concentration of gases is reached either in the enclosed space being fumigated by my new method above set forth or in the vicinity thereof, the intense lacrymal effect causes persons to seek the outside air. I conducted an experiment in which my fumigant was tested by fumigating one room in a building while the adjacent room was occupied and in which the usual precaution of chinking up all the cracks around the door between the two rooms was not observed. Although the rate of leakage was such that a dangerous concentration of gases was not reached in the occupied room until after a lapse of fifteen minutes; nevertheless, the atmosphere of the room became unbearable within three minutes.

The new fumigant is as safe to store and handle as liquid hydrocyanic acid in spite of the fact that cyanogen chloride alone boils at 13° C., considerably below ordinary atmospheric temperatures. I heated a liquid mixture of 22% cyanogen chloride in hydrocyanic acid to a temperature of 52° C., which is the highest temperature the fumigant would attain under any conditions, and found that it developed a vapor pressure of 26 pounds, which is not appreciably greater than that of liquid hydrocyanic acid under the same conditions. The mixture is less inflammable than hydrocyanic acid alone and there is no reaction between the components thereof, nor does the water present decompose the cyanogen chloride if the mixture is slightly acid. The slight acidity of the mixture preserves the same completely and a higher acidity than that mentioned may be used, but it adds little to the preserving power and has the added disadvantage of causing corrosion of metals. Liquid mixtures containing cyanogen chloride may be safely stored and transported in the metal cylinders ordinarily used for highly volatile liquids.

I have indicated that I prefer to use a mixture containing a major proportion of hydrocyanic acid and I usually use less than 30% of cyanogen chloride therein although I may make the cyanogen chloride the principal ingredient. Since the toxicity of cyanogen chloride is considered to be less than that of hydrocyanic acid, I generally use a minimum amount thereof but sufficient so that its lacrymal effect is great enough to give adequate warning. A mixture containing 10%–15% of cyanogen chloride is suitable for general use. In the method of fumigating described above in which a portion of the fumigant is first injected to give warning, I may use a fumigant rich in cyanogen chloride or even consisting mainly thereof to act as a warning gas, and then use a mixture relatively low in cyanogen chloride for the fumigation itself.

The composition of my new fumigant may be varied within wide limits with good results and the details of the method of application thereof may be altered to suit conditions. For instance, instead of applying the same in a spraying device of the Jackson type, I may vaporize the fumigant by placing it in an open dish or by heating the same in a suitable apparatus. These and other changes may be made in my invention within the scope thereof, which is set forth in the claims appended hereto.

What I claim is:

1. A fumigant comprising a mixture of cyanogen chloride and hydrocyanic acid in liquid form.

2. A fumigant comprising a mixture of cyanogen chloride and hydrocyanic acid in liquid form, the hydrocyanic acid being the major constituent.

3. A fumigant comprising a mixture of cyanogen chloride and hydrocyanic acid in liquid form, and a small amount of water.

4. A fumigant comprising a mixture of cyanogen chloride and hydrocyanic acid in liquid form, the said mixture having an acid reaction.

5. A fumigant comprising a mixture of cyanogen chloride and hydrocyanic acid in liquid form, the said mixture being slightly acid to methyl orange indicator.

6. A fumigant comprising a mixture of cyanogen chloride and hydrocyanic acid in liquid form, the said mixture having an acidity of 0.01 to 0.025 normal.

7. A fumigant comprising a mixture of cyanogen chloride and hydrocyanic acid in liquid form, and a small amount of water, the said mixture having an acid reaction.

8. A fumigant comprising a mixture of cyanogen chloride and hydrocyanic acid in liquid form and a small amount of water, the said mixture being slightly acid to methyl orange indicator.

9. A fumigant comprising a mixture of cyanogen chloride and hydrocyanic acid in liquid form, with less than 10% of water.

10. A fumigant comprising a mixture of cyanogen chloride and hydrocyanic acid in liquid form with less than 10% of water, the hydrocyanic acid being in excess of 50% of the total.

11. A fumigant comprising a mixture of cyanogen chloride and hydrocyanic acid in liquid form, and a small amount of water, the cyanogen chloride being less than 30% of the total.

12. A fumigant comprising about 10%–15% cyanogen chloride, about 80%–86% hydrocyanic acid and about 2%–4% of water, the mixture being slightly acid to methyl orange indicator.

13. A method of fumigating which comprises providing a fumigant containing cyanogen chloride and hydrocyanic acid, introducing a small amount thereof into the space to be fumigated to act as a warning to persons who might be present therein, and then introducing the proper amount of fumigant for the fumigation of said space.

14. A method of fumigating which comprises providing a fumigant containing liquid cyanogen chloride and hydrocyanic acid, introducing a small amount thereof into the space to be fumigated to act as a warning to persons who might be present therein, and then introducing the proper amount of fumigant for the fumigation of said space.

15. A method of fumigating which comprises providing a fumigant containing liquid cyanogen chloride and hydrocyanic acid, introducing an amount thereof into the space to be fumigated sufficient to act as a warning to persons who might be present therein but insufficient to cause death, and then introducing the proper amount of fumigant for the fumigation of said space.

In testimony whereof, I have hereunto subscribed my name this 8th day of January 1925.

GUY H. BUCHANAN.